United States Patent
Suzuki

(10) Patent No.: US 10,961,899 B2
(45) Date of Patent: Mar. 30, 2021

(54) INTERNAL COMBUSTION ENGINE

(71) Applicant: TOYOTA JIDOSHA KABUSHIKI KAISHA, Toyota (JP)

(72) Inventor: Hisao Suzuki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/215,701

(22) Filed: Dec. 11, 2018

(65) Prior Publication Data
US 2019/0195120 A1    Jun. 27, 2019

(30) Foreign Application Priority Data
Dec. 27, 2017 (JP) .............................. JP2017-251238

(51) Int. Cl.
*F02B 19/12* (2006.01)
*F02B 19/18* (2006.01)

(52) U.S. Cl.
CPC .............. *F02B 19/12* (2013.01); *F02B 19/18* (2013.01)

(58) Field of Classification Search
CPC ................................ F02B 19/12; F02B 19/108
USPC ........ 123/143 R, 169 R, 253, 254, 256, 260, 123/262, 263, 266, 267, 286
See application file for complete search history.

(56) References Cited

U.S. PATENT DOCUMENTS

| | | | | |
|---|---|---|---|---|
| 2,153,598 A | * | 4/1939 | Steward | F02B 19/1095 123/169 V |
| 4,416,228 A | * | 11/1983 | Benedikt | F02B 19/1009 123/169 EL |
| 4,452,189 A | * | 6/1984 | Latsch | F02B 19/12 123/143 B |
| 7,100,567 B1 | * | 9/2006 | Bailey | F02B 19/06 123/268 |
| 7,856,956 B2 | * | 12/2010 | Inoue | F02B 19/12 123/169 R |
| 8,181,617 B2 | * | 5/2012 | Kuhnert | F02P 23/04 123/143 B |
| 9,856,835 B1 | * | 1/2018 | Coldren | F02M 37/0064 |
| 2003/0196634 A1 | * | 10/2003 | Lausch | F02B 1/12 123/260 |

(Continued)

FOREIGN PATENT DOCUMENTS

| | | |
|---|---|---|
| CN | 106870116 A | 6/2017 |
| JP | 53-99110 | 8/1978 |
| JP | 2009-197704 | 9/2009 |

*Primary Examiner* — Sizo B Vilakazi
(74) *Attorney, Agent, or Firm* — Oblon, McClelland, Maier & Neustadt, L.L.P.

(57) ABSTRACT

An internal combustion engine includes: a combustion chamber surrounded by a cylinder bore wall, a piston crown part, and a cylinder head wall; a spark plug arranged at the cylinder head wall and having a spark generating part; and a partitioning wall part partitioning the combustion chamber into a main combustion chamber at which the piston crown part is exposed and an ignition chamber at which the spark generating part is exposed, the partitioning wall part being formed with a plurality of through holes connecting the main combustion chamber and the ignition chamber. The axes of the plurality of through holes are formed so that at predetermined regions from ignition chamber side opening parts of the plurality of through holes, the directions toward the ignition chamber side opening parts all are substantially the same.

6 Claims, 3 Drawing Sheets

(56) References Cited

U.S. PATENT DOCUMENTS

| | | | | |
|---|---|---|---|---|
| 2005/0092285 A1* | 5/2005 | Klonis | ................... | F02B 19/12 |
| | | | | 123/266 |
| 2005/0205050 A1* | 9/2005 | Kubo | ................... | F02B 17/005 |
| | | | | 123/260 |
| 2005/0211217 A1* | 9/2005 | Boley | ................... | F02B 19/12 |
| | | | | 123/266 |
| 2006/0219210 A1* | 10/2006 | Bailey | ................... | F02B 19/12 |
| | | | | 123/259 |
| 2011/0308489 A1* | 12/2011 | Herden | .................. | F02B 19/12 |
| | | | | 123/143 B |
| 2012/0103302 A1* | 5/2012 | Attard | ................... | F02B 19/12 |
| | | | | 123/260 |
| 2012/0125287 A1* | 5/2012 | Chiera | ................... | F02B 19/12 |
| | | | | 123/254 |
| 2013/0206122 A1* | 8/2013 | Chiera | ................... | H01T 13/54 |
| | | | | 123/594 |
| 2015/0040845 A1* | 2/2015 | Chiera | ................. | F02B 19/108 |
| | | | | 123/41.32 |
| 2017/0167358 A1* | 6/2017 | Maier | ................. | F02B 19/1019 |
| 2017/0167359 A1* | 6/2017 | Maier | ................ | F02B 19/18 |
| 2017/0306917 A1* | 10/2017 | Kim | ....................... | F02B 19/14 |
| 2018/0135506 A1* | 5/2018 | Grover, Jr. | ............ | F02P 5/045 |

\* cited by examiner

INTERNAL COMBUSTION ENGINE

CROSS-REFERENCE TO RELATED APPLICATION

The present application claims priority to Japanese Patent Application No. 2017-251238 filed on Dec. 27, 2017, which is incorporated herein by reference in its entirety including the specifications, drawings and abstract.

FIELD

The present invention relates to an internal combustion engine producing a flame in an ignition chamber in which a spark plug is exposed and ejecting that flame from the ignition chamber to a main combustion chamber.

BACKGROUND

In one of the conventionally known internal combustion engines (below, also referred to as a "conventional engine"), an ignition chamber starting to burn an air-fuel mixture by a spark produced by the spark plug is formed inside a combustion chamber by a plug cover covering an ignition point of a spark plug (spark generating part). The part of the combustion chamber other than the ignition chamber will be referred to for convenience as the "main combustion chamber".

In a conventional engine, in the intake stroke, fuel is injected from a fuel injector to the ignition chamber. Part of the injected fuel passes through through holes formed in the plug cover together with the air in the intake stroke, and is exhausted to the main combustion chamber. As a result, the air-fuel mixture is supplied to the ignition chamber and the main combustion chamber, and the air-fuel mixture is compressed in the compression stroke. At the time of the compression stroke, part of the air-fuel mixture in the main combustion chamber passes through the through holes and again flows into the ignition chamber. Then, near compression top dead center, the air-fuel mixture inside the ignition chamber is ignited by the spark for ignition generated from the spark plug, and a flame is generated by the start of combustion of the air-fuel mixture. This flame is ejected from the ignition chamber through the through holes to the main combustion chamber. Due to this injected flame, a large disturbance of the air flow is caused inside the main combustion chamber, and the air-fuel mixture remaining inside the main combustion chamber is ignited rapidly by the ejected flame and burned in a short time.

As prior art of an internal combustion engine having an ignition chamber, a conventional engine ejecting an air-fuel mixture starting to burn in an ignition chamber from the ignition chamber to a main combustion chamber through a plurality of through holes formed radially in a plug cover is known (for example, see Japanese Unexamined Patent Publication No. 2009-197704).

SUMMARY

Technical Problem

However, in a conventional engine, a plurality of through holes are radially arranged, and therefore facing velocity components may be formed in the gas flowing through the through holes into the ignition chamber, and the flow rate of the air flow inside the ignition chamber may be attenuated. As a result, the ignition performance inside the ignition chamber is liable to fall.

The present invention was made for dealing with this problem. That is, one object of the present invention is to provide an internal combustion engine able to suppress the attenuation of the flow rate of the air flow inside the ignition chamber and to suppress a drop in the ignition performance inside the ignition chamber.

The internal combustion engine of the present invention (hereinafter, referred to as "present invention engine") is an internal combustion engine comprising:

a combustion chamber (CC) surrounded by a cylinder bore wall (21), a piston crown part (31), and a cylinder head wall (41);

a spark plug (80) arranged at the cylinder head wall and having a spark generating part (81); and a partitioning wall part (90) partitioning the combustion chamber into a main combustion chamber (CM) at which the piston crown part is exposed and an ignition chamber (CI) at which the spark generating part is exposed, the partitioning wall part being formed with a plurality of through holes (91-96) connecting the main combustion chamber and the ignition chamber.

The axes (91Y-96Y) of the plurality of through holes are formed so that at predetermined regions (90x) from ignition chamber side opening parts (91a-96a) of the plurality of through holes, the directions toward the ignition chamber side opening parts all are substantially the same.

Therefore, according to an engine of the present invention, it is possible to suppress attenuation of the flow rate of the air flow of the air-fuel mixture flowing from the main combustion chamber through the through holes into the ignition chamber, and therefore improve the ignition performance inside the ignition chamber.

In one aspect of the present invention engine, the axes of the plurality of through holes are formed so as to face the direction of the spark generating part at the predetermined regions.

Therefore, according to the above aspect, the flow rate of the air-fuel mixture around the spark plug becomes faster and the ignition performance inside the ignition chamber can be kept from dropping.

In one aspect of the present invention engine,
the plurality of through holes are formed so as to be bent at their middles.

Therefore, according to the above other aspect, flame can be ejected in many directions inside the main combustion chamber.

In one aspect of the present invention engine,
the ignition chamber side opening part is positioned concentrically; and
the plurality of through holes are formed bent at substantially the same angles in a direction away from a center axis of the ignition chamber.

Therefore, according to the above other aspect, flame can be ejected radially inside of the main combustion chamber.

In one aspect of the present invention engine,
the plurality of through holes are formed so that the lengths of the plurality of through holes are substantially the same.

Therefore, according to the above other aspect, biasing of the flame ejected from the through holes can be suppressed.

In the above explanation, to assist in understanding of the present invention, in relation to components of the invention corresponding to the embodiments, which will be explained later, the names and/or notations used in the embodiments are shown in parentheses. However, the components of the present invention are not limited to the embodiments prescribed by the above names and/or notations. Other objects, other features, and accompanying advantages of the present invention will be easily understood from the explanation regarding the embodiments of the present invention described with reference to the following drawings.

DESCRIPTION OF EMBODIMENTS

Figure 1:
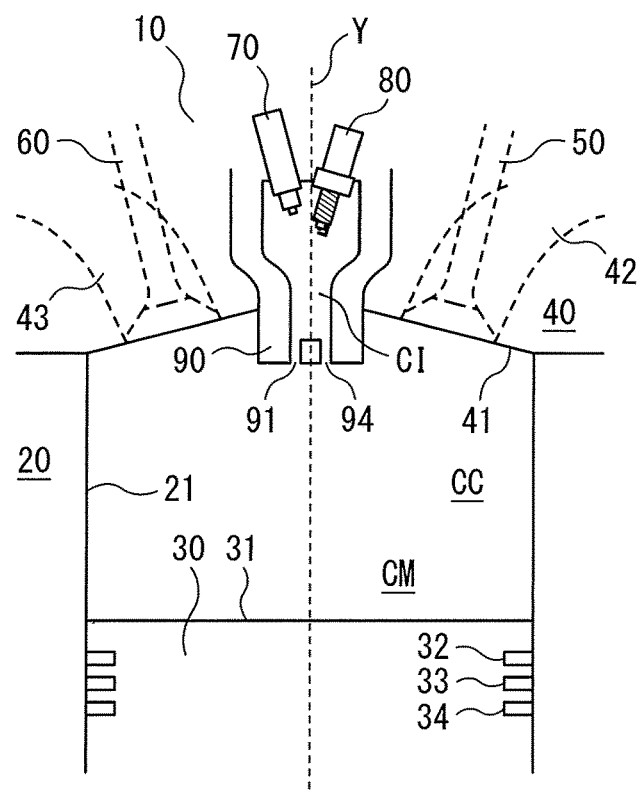
FIG. 1 is a longitudinal cross-sectional view of a portion near a combustion chamber of an internal combustion engine according to a first embodiment of the present invention.

Below, internal combustion engines according to embodiments of the present invention (below, referred to as the "engines") will be explained while referring to the drawings. These engines are multicylinder, reciprocating piston type, four-cycle, gasoline fuel, spark ignition type internal combustion engines.

First Embodiment

Configuration

As shown in FIG. 1, an engine 10 according to a first embodiment of the present invention is provided with a cylinder block 20, pistons 30, a cylinder head 40, intake ports 42, exhaust ports 43, intake valves 50, exhaust valves 60, fuel injectors 70, spark plugs 80, and partitioning wall parts 90. Note that, FIG. 1 is a longitudinal cross-sectional view of a specific cylinder. The other cylinders have similar structures to the structure shown in FIG. 1.

The cylinder block 20 is provided with cylinder bores. Each cylinder bore forms a cylindrically shaped cylinder bore wall 21. Note that, the cylinder bore sometimes has a cylinder liner attached. In this case, the cylinder liner also forms part of a cylinder bore wall.

Each piston 30 has a substantially columnar shape and is housed inside the cylinder bore. The top surface of the piston 30 forms a piston crown part 31. Furthermore, at the side part of the piston crown part 31, three piston rings 32, 33, and 34 are assembled. The piston rings 32, 33, and 34 slide with respect to the cylinder bore wall 21 when the piston 30 reciprocates inside the cylinder bore.

The cylinder head 40 is arranged at the top end of the cylinder block 20. The cylinder head 40 is provided with a wall, which closes the top opening parts of the cylinder bores (below, referred to as the "cylinder head wall 41"). The cylinder head wall 41 defines combustion chambers CC together with the piston crown parts 31 and cylinder bore walls 21. Furthermore, the cylinder head 40 is formed with intake ports 42 and exhaust ports 43 which are communicated with the later explained main combustion chambers CM.

Intake valves 50 are designed to open and close the intake ports 42 by being driven by intake cams provided at an intake camshaft (not shown). Similarly, exhaust valves 60 are designed to open and close the exhaust ports 43 by being driven by exhaust cams provided at an exhaust camshaft (not shown).

Figure 2:
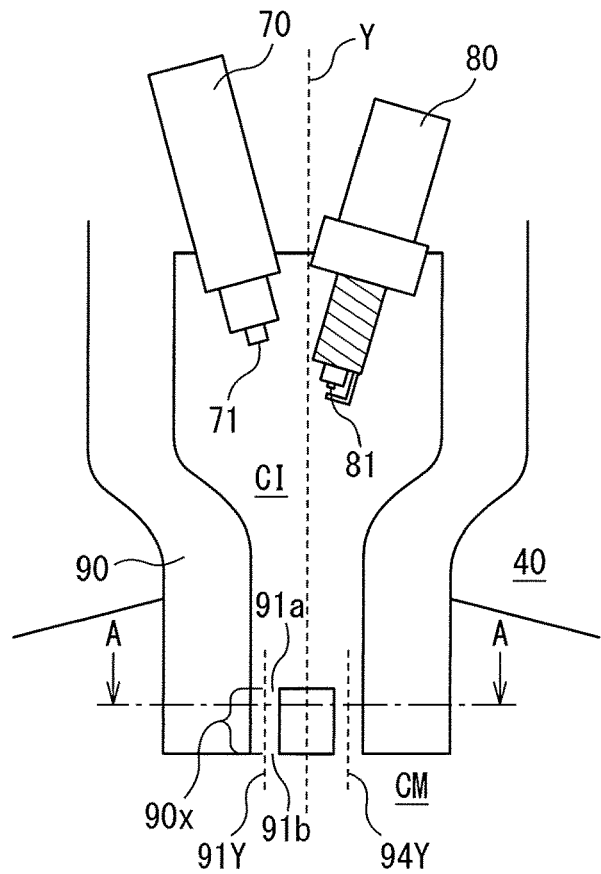
FIG. 2 is a longitudinal cross-sectional view of an ignition chamber in the first embodiment of the present invention.

FIG. 2 is an enlarged view of the vicinity of a partitioning wall part 90 in the present embodiment. Fuel injectors 70 are arranged in the cylinder head 40. Each fuel injector 70 is provided with a nozzle hole 71 at its tip from which fuel is injected. The fuel injector 70 is arranged so that the nozzle hole 71 is exposed at an ignition chamber CI, which will be explained later. The fuel injector 70 injects fuel based on an instruction from a electronic control unit (ECU) not shown in the drawings.

Spark plugs 80 are arranged at the cylinder head 40. Each spark plug 80 is provided, at its tip, with a spark generating part (center electrode and ground electrode) 81 generating a spark. The spark plug 80 is arranged so that the spark generating part 81 is exposed at the ignition chamber CI, which will be explained later. The spark plug 80 generates a spark for ignition based on an instruction from the electronic control unit.

Each partitioning wall part 90 is attached to a cylinder head wall 41 so as to cover a spark generating part 81 of a spark plug 80 and a nozzle hole 71 of a fuel injector 70 and to stick out from a top wall part of a combustion chamber CC (that is, the cylinder head wall 41) into the combustion chamber CC. In other words, the partitioning wall part 90 partitions the combustion chamber CC into a main combustion chamber CM in which the cylinder bore wall 21 and piston crown part 31 are exposed and an ignition chamber CI in which the spark generating part 81 is exposed.

Figure 3:
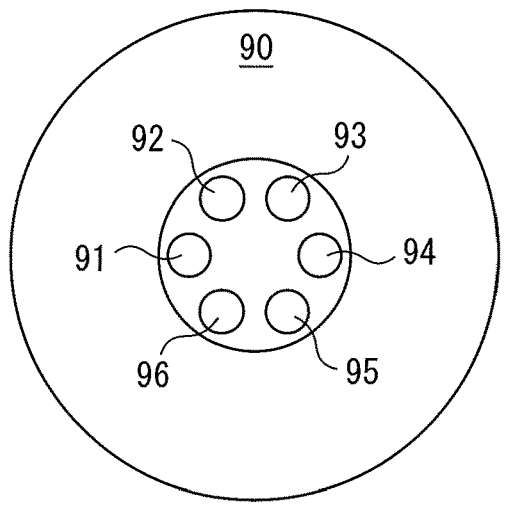
FIG. 3 is a lateral cross-sectional view along AA of an internal combustion engine according to the first embodiment of the present invention.

FIG. 3 is a lateral cross-sectional view along AA of a partitioning wall part 90. The partitioning wall part 90 is provided with six (a plurality of) through holes (first through hole 91 to sixth through hole 96) which connect the ignition chamber CI and the main combustion chamber CM. The shapes of these first through hole 91 to sixth through hole 96 are cylindrical shapes. Further, the lengths of the first through hole 91 to the sixth through hole 96 are all substantially the same.

The center axes of the first through hole 91 to the sixth through holes 96 (91Y to 96Y) are set parallel to the center axis Y of the cylinder bore in predetermined regions 90x of the through holes. In the present embodiment, the region from the first opening part 91a, which is the end part of the first through hole 91 at the ignition chamber CI side, to the first flame ejection port 91b, which is opposed to the first opening part 91a, is the predetermined region 90x. The same is true for the second through hole 92 to sixth through hole 96. Further, the center axes of the through holes (91Y to 96Y) are arranged so as to face the directions of the spark generating parts 81. Further, the first opening part 91a to the sixth opening part 96a are arranged in the same concyclic points.

Operation

In the engine 10, at the intake stroke, fuel is injected from a fuel injector 70 to the ignition chamber CI. Part of the injected fuel passes through the first through hole 91 to the sixth through hole 96 and is exhausted to the inside of the main combustion chamber CM together with the gas inside the ignition chamber CI, due to the negative pressure resulting from the descent of the piston 30. As a result, the air-fuel mixture (gasoline air-fuel mixture) is supplied to the insides of the ignition chamber CI and the main combustion chamber CM. In the compression stroke, the air-fuel mixture is compressed. At the time of the compression stroke, part of the air-fuel mixture inside the main combustion chamber CM passes through the first through hole 91 to the sixth through hole 96 to again flow into the ignition chamber CI. Then, near compression top dead center, a spark for ignition is made to be generated from the spark generating part 81. Due to this spark for ignition, the air-fuel mixture inside the ignition chamber CI is ignited and the air-fuel mixture starts to burn. That is, a flame is generated. Due to the combustion of this air-fuel mixture, the pressure inside the ignition chamber CI becomes a high pressure, and therefore the flame (air-fuel mixture being burned, that is, high temperature gas) passes from the ignition chamber CI through the first through hole 91 to the sixth through hole 96 and is ejected to the main combustion chamber CM. Due to this injected flame, a large disturbance of the air flow is caused inside the main combustion chamber CM. Further, the air-fuel mixture remaining inside the main combustion chamber CM is ignited rapidly by the ejected flame and burned in a short time period.

As explained above, in the engine 10 according to the present embodiment, since the axes of the first through hole 91 to sixth through hole 96 are set parallel with the center axis Y of the cylinder bore in predetermined regions 90x of the respective through holes, the air-fuel mixture passing through the through holes and flowing into the ignition chamber in the compression stroke can be kept from attenuating itself inside the ignition chamber, and therefore the flow rate of the air flow inside the ignition chamber can be kept from attenuating. Furthermore, since the axes of the respective through holes face the direction of the spark generating part 81, it is possible to raise the flow rate of the air-fuel mixture around the spark generating part 81. Therefore, the ignition performance inside the ignition chamber is improved.

Second Embodiment

Figure 4:
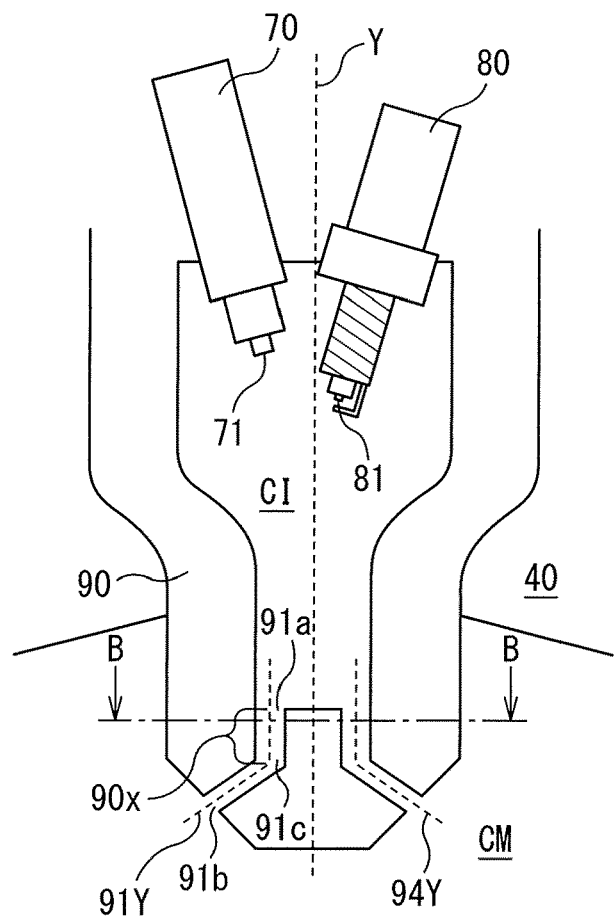
FIG. 4 is a longitudinal cross-sectional view of an ignition chamber in a second embodiment of the present invention.
Figure 5:
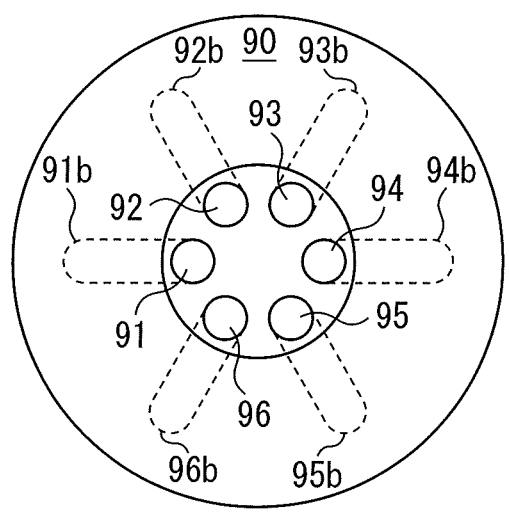
FIG. 5 is a lateral cross-sectional view along BB of an internal combustion engine according to the second embodiment of the present invention.

The engine according to the second embodiment of the present invention, as shown in FIGS. 4 and 5, differs from the engine 10 according to the first embodiment, only on the point of the different shapes of the first through hole 91 to the sixth through hole 96. Explained more specifically, in the first embodiment, the through holes were straight shapes, but the through holes in the present embodiment are bent in the middles. Below, these points of difference will be mainly explained.
Configuration FIG. 4 is an enlarged view of the vicinity of a partitioning wall part 90 in the present embodiment. FIG. 5 is a lateral cross-sectional view along BB of the partitioning wall part 90. Similarly to the first embodiment, the partitioning wall part 90 is provided with six (a plurality) of through holes (first to sixth through holes) 91 to 96 which respectively connect the ignition chamber CI and the main combustion chamber CM.

The axes (center axes) of the first through hole 91 to the sixth through hole 96 are set parallel to the center axis Y of the cylinder bore in predetermined regions 90x of the respective through holes. In the present embodiment, the region from the first opening part 91a, which is the end part of the first through hole 91 at the ignition chamber CI side, to the first bent part 91c, which will be explained later, is the predetermined region 90x. The same is true for the other through holes. Furthermore, in the predetermined region 90x of each through hole, the axes of the respective through holes are set so as to face the direction of the spark generating part 81. Further, the first opening part 91a to the sixth opening part 96a are arranged in the same concyclic points.

The first through hole 91 to the sixth through hole 96 have a first bent part 91c to sixth bent part 96c in the middles. The through holes are bent at the first bent part 91c to the sixth bent part 96c by approximately the same angles in directions facing the center axis of the ignition chamber CI. Furthermore, the lengths of the through holes 91 to 96 are substantially the same.
Operation The operation in the present embodiment is basically similar to the operation in the first embodiment, but the way the flame is ejected differs. Near compression top dead center, the air-fuel mixture inside the ignition chamber CI is ignited by the spark for ignition generated from the spark generating part 81 whereby the air-fuel mixture starts burning and a flame is generated. Due to the air-fuel mixture burning, the pressure inside the ignition chamber CI becomes high, and therefore the flame passes from the ignition chamber CI through the first through hole 91 to sixth through hole 96 and ejected radially to the main combustion chamber CM. Due to this injected flame, a large disturbance in the air flow is caused inside the main combustion chamber CM. Further, the air-fuel mixture remaining inside the main combustion chamber CM is ignited rapidly by the ejected flame and burned in a short time.

Figure 6:
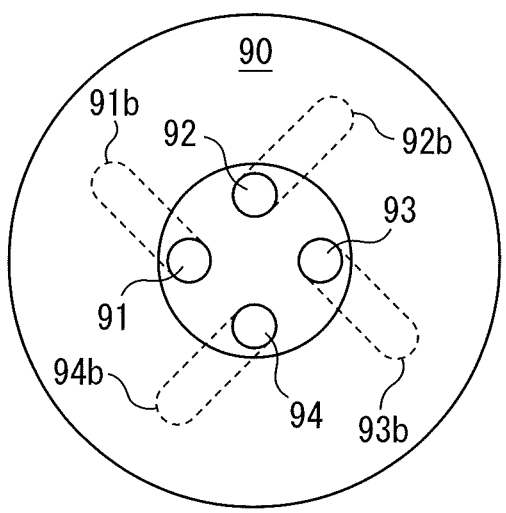
FIG. 6 is a cross-sectional view of an ignition chamber and partitioning wall part in a modification of the present invention.

As explained above, in the engine 10 according to the present embodiment, since the axes of the first through hole 91 to the sixth through hole 96 are set parallel to the center axis Y of the cylinder bore in predetermined regions 90x of the respective through holes, the air-fuel mixture passing through the through holes and flowing into the ignition chamber in the compression stroke can be kept from attenuating itself inside the ignition chamber and the flow rate of the air flow inside the ignition chamber can be kept from attenuating. Furthermore, the axes of the respective through holes face the direction of the spark generating part 81, and therefore the flow rate of the air-fuel mixture around the spark generating part 81 can be enhanced. Therefore, the ignition performance inside the ignition chamber CI is improved. Further, since the through holes are bent at substantially the same angles, flames can be ejected radially in the main combustion chamber. Therefore, in the main combustion chamber CM, the air-fuel mixture can be made to uniformly burn.
Other Modifications Above, preferred embodiments according to the present invention were explained, but the present invention is not limited to these embodiments. Various modifications and changes may be made within the scope of the language of the claims. For example, FIG. 6 is a cross-sectional view of the ignition chamber CI and partitioning wall part 90 in the modification. In the above first embodiment and second embodiment, the partitioning wall part 90 was provided with six through holes, but the invention is not limited to this. As shown in FIG. 6, it may be provided with four through holes. Further, in the second embodiment, the through holes were configured to be bent by substantially the same angles at the bent parts in directions facing the center axis of the ignition chamber CI, but they may also be bent by substantially the same angles in directions deviated by predetermined angles from the facing directions such as shown in FIG. 6. Further, the angles of bending need not be substantially the same. The bending may be performed at different angles.

Further, in the above first embodiment and the second embodiment, each fuel injector 70 had been arranged in the ignition chamber CI, but each fuel injector 70 may also be arranged inside the intake port 42. If the fuel injector 70 is arranged only inside the intake port 42, fuel is injected at the intake stroke. At the time of the subsequent compression stroke, part of the air-fuel mixture inside the main combustion chamber CM passes through the first through hole 91 to the sixth through hole 96 to flow into the ignition chamber CI. As a result, the air-fuel mixture is supplied to the insides of the ignition chamber CI and the main combustion chamber CM.

The invention claimed is:

1. An internal combustion engine comprising:
  a combustion chamber surrounded by a cylinder bore wall, a piston crown part, and a cylinder head wall;
  a spark plug arranged at the cylinder head wall and having a spark generating part; and
  a partitioning wall part partitioning the combustion chamber into a main combustion chamber at which the piston crown part is exposed and an ignition chamber at which the spark generating part is exposed, the partitioning wall part being formed with a plurality of through holes connecting the main combustion chamber and the ignition chamber,
  wherein the plurality of through holes are formed so that, in a compression stroke, an air-fuel mixture in the main combustion chamber flows through the plurality of through-holes into the ignition chamber, and
  wherein axes of the plurality of through holes are formed so that at predetermined regions from ignition chamber side opening parts of the plurality of through holes, directions, toward the ignition chamber side opening parts, of all of the through holes are substantially same and are parallel to each other.

2. The internal combustion engine according to claim 1, wherein
  the axes of the plurality of through holes are formed so as to face a direction of the spark generating part at the predetermined regions.

3. The internal combustion engine according to claim 1, wherein
  middles of the plurality of through holes are bent.

4. The internal combustion engine according to claim 3, wherein
  the ignition chamber side opening part is positioned concentrically; and
  the plurality of through holes are formed bent at substantially same angles in a direction away from a center axis of the ignition chamber.

5. The internal combustion engine according to claim 1, wherein
  the plurality of through holes are formed so that lengths of the plurality of through holes are substantially equal.

6. The internal combustion engine according to claim 1, wherein
  the axes of the plurality of through holes at the predetermined regions are parallel to a center axis of the ignition chamber.

* * * * *